(12) United States Patent
Tohyama et al.

(10) Patent No.: US 8,166,634 B2
(45) Date of Patent: May 1, 2012

(54) WORKPIECE MOUNTING DEVICE

(75) Inventors: Shinji Tohyama, Toyota (JP); Koji Tomida, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 379 days.

(21) Appl. No.: 12/514,559

(22) PCT Filed: Jul. 30, 2008

(86) PCT No.: PCT/JP2008/064077
§ 371 (c)(1),
(2), (4) Date: May 27, 2009

(87) PCT Pub. No.: WO2009/031379
PCT Pub. Date: Mar. 12, 2009

(65) Prior Publication Data
US 2010/0028113 A1  Feb. 4, 2010

(30) Foreign Application Priority Data
Sep. 7, 2007 (JP) ................................ 2007-233091

(51) Int. Cl.
*B23Q 15/00* (2006.01)
(52) U.S. Cl. ................... 29/714; 29/822; 29/824
(58) Field of Classification Search .......... 29/822, 29/823, 824, 709, 714, 721, 430
See application file for complete search history.

(56) References Cited

U.S. PATENT DOCUMENTS

| | | | | |
|---|---|---|---|---|
| 4,734,979 A | * | 4/1988 | Sakamoto et al. | 29/822 |
| 4,738,022 A | * | 4/1988 | Sakamoto et al. | 29/712 |
| 4,928,383 A | * | 5/1990 | Kaczmarek et al. | 29/711 |
| 4,928,386 A | * | 5/1990 | Schupp et al. | 29/824 |
| 5,123,161 A | * | 6/1992 | Kubo et al. | 29/784 |
| 5,143,270 A | * | 9/1992 | Hamada et al. | 228/4.1 |
| 5,152,050 A | * | 10/1992 | Kaczmarek et al. | 29/711 |
| 5,513,428 A | * | 5/1996 | Shiramizu et al. | 29/712 |
| 6,109,424 A | * | 8/2000 | Doan | 198/468.8 |

(Continued)

FOREIGN PATENT DOCUMENTS

| | | |
|---|---|---|
| JP | 06-115426 A | 4/1994 |
| JP | 06-190662 | 7/1994 |
| JP | 06190662 A * | 7/1994 |
| JP | 10-059236 A | 3/1998 |

(Continued)

OTHER PUBLICATIONS

Machine English Translation of JP 2006-130585.*

*Primary Examiner* — Essama Omgba
(74) *Attorney, Agent, or Firm* — Kenyon & Kenyon LLP (57) ABSTRACT

When a lift moves up, the lift is moved by a lifting guide under an urging force of urging means in a direction opposite to a direction of movement of a hanger. Consequently, a synchronizing bar of the lift approaches the hanger and makes contact with a front surface in the direction of movement of the hanger in a sure and also soft manner, thus resulting in synchronization between the hanger and a self-propelled lifting carriage, regardless of a relative speed between the hanger and the self-propelled lifting carriage. Therefore, because no excessive impact is applied to the synchronizing bar and thereby a necessity to provide excessive strength in the synchronizing bar and the neighboring part thereof is eliminated, the self-propelled lifting carriage can be avoided from becoming large in size or being increased in weight. In addition, acceleration, deceleration, and quick stop of the self-propelled lifting carriage also become easy.

20 Claims, 5 Drawing Sheets

U.S. PATENT DOCUMENTS

| | | | |
|---|---|---|---|
| 6,308,404 B1 * | 10/2001 | Hirschmann et al. | 29/822 |
| 6,427,321 B2 * | 8/2002 | Fedato et al. | 29/787 |
| 6,739,031 B2 * | 5/2004 | Shimizu | 29/430 |
| 2010/0126006 A1 * | 5/2010 | Kohler et al. | 29/822 |

FOREIGN PATENT DOCUMENTS

| | | |
|---|---|---|
| JP | 2003-072608 A | 3/2003 |
| JP | 2006-130585 A | 5/2006 |
| JP | 2006-347488 A | 12/2006 |

* cited by examiner

WORKPIECE MOUNTING DEVICE

This is a 371 national phase application of PCT/JP2008/064077 filed 30 Jul. 2008, claiming priority to Japanese Patent Application No. JP 2007-233091 filed 07 Sep. 2007, the contents of which are incorporated herein by reference.

TECHNICAL FIELD

The present invention relates to a workpiece mounting device for lifting up a workpiece and mounting the workpiece in a predetermined position of an object for workpiece mounting that is transported in the state of being suspended by a hanger.

BACKGROUND ART

Conventionally, in a motor vehicle assembly line, a mounting device has been used for mounting a mounted object (hereinafter called "workpiece") such as an engine and a suspension member to a vehicle. This mounting device has a lifting carriage that runs parallel to a vehicle body moving in a suspended state by a hanger. Then, by mounting, for example, an engine on the lifting carriage and lifting up the engine from below the vehicle body, the mounting device performs the operation of putting the engine into an engine room of the vehicle body and fixing the engine to the vehicle body. The mounting device can be of a type in which one lifting carriage reciprocates parallel to a moving path of the hanger, or of another type in which a plurality of lifting carriages move along a running path of a looped shape (refer, for example, to Patent Document 1).

[Patent Document 1]
Japanese Patent Application Publication No. JP-A-6-190662 (paragraphs [0005], [0007], and [0010]; and FIGS. 2 to 4)

DISCLOSURE OF THE INVENTION

[Problem to be Solved by the Invention]

Now, in the mounting device described above, a mechanical synchronization system or an electrical synchronization system has conventionally been used as a method for synchronizing the lifting carriage with the moving hanger.

The mechanical synchronization system, although it does not require delicate control for synchronizing the hanger and the lifting carriage, requires a clamping unit for synchronizing the hanger and the lifting carriage without a small displacement, thereby causing the mechanical structure to be complex, the lifting carriage to be larger in size, and the weight to be increased. In addition, because the running surface for the lifting carriage is also generally used for a work floor surface, the clamping unit needs to be provided with an overload detecting device in order to prevent a device damage caused by an event in which the lifting carriage catches a foreign object dropped on the running surface, causing the lifting carriage to be further large-sized and to further increase the weight.

On the other hand, in the case of the electrical synchronization system, because control is performed by comparing the speeds of the hanger and the lifting carriage, if an abnormality occurs in the hanger, the abnormality extends to the lifting carriage and therefore it is difficult to immediately distinguish which has caused the abnormality. In addition, in order to check the electrical synchronization between the hanger and the lifting carriage, it is difficult to perform the synchronization checking operation only on the side of the lifting carriage, thus requiring also the hanger side that constitutes a continuous line system to be operated.

In view of the problems described above, it is an object of the present invention to perform synchronization between a hanger and a lifting carriage in a workpiece mounting device in a simple and reliable manner.

[Means for Solving the Problem]

The aspects of the invention described below serve to exemplify structures of the present invention, and will be described in an itemized manner in order to facilitate easy understanding of a variety of the structures of the present invention. Each item does not serve to limit the technical scope of the present invention, but can also be included in the technical scope of the present applied invention even if some of the components of the each item are replaced or deleted, or other components are further added while considering the best modes for carrying out the invention.

[Exemplary Form of the Invention]

(1) A workpiece mounting device including a hanger that hangs and transports an object for workpiece mounting, and a self-propelled lifting carriage that moves along with the hanger in a state of being mounted with a workpiece on a running path installed in a manner at least partially parallel to a moving path of the hanger, in which the self-propelled lifting carriage is equipped with a lift that is movable within a certain range in parallel with the moving path of the hanger, and urging means that urges the lift in a direction opposite to a direction of movement of the hanger, and in which the lift is equipped with a synchronizing bar that is extendable and contractible in the up-down direction and makes contact with a front surface in the direction of movement of the hanger, and a lifting guide that moves the lift in the direction opposite to the direction of movement of the hanger under the urging force of the urging means during a period from when the lift starts moving upward until at least a predetermined height is reached.

According to the workpiece mounting device described in this item, the lift under the urging force of the urging means is moved by the lifting guide in the direction opposite to the direction of movement of the hanger during the period from when the lift starts moving upward until at least a predetermined height is reached. Therefore, if the synchronizing bar of the lift is extended and in the state of being capable of contacting the front surface in the direction of movement of the hanger, the synchronizing bar of the lift approaches the hanger and makes contact with the front surface in the direction of movement of the hanger in a sure and also soft manner, thus resulting in synchronization between the hanger and the self-propelled lifting carriage, regardless of a relative speed between the hanger and the self-propelled lifting carriage.

(2) The workpiece mounting device in which the lifting guide has a mechanical structure in which a follower attached to the lift moves along a guide member that is fixed in position on the self-propelled lifting carriage and has at least an inclined surface sloping upward in the direction opposite to the direction of movement of the hanger.

In the workpiece mounting device described in this item, because the lifting guide has a mechanical structure in which the follower attached to the lift moves along the guide member that is fixed in position on the self-propelled lifting carriage and has at least an inclined surface sloping upward in the direction opposite to the direction of movement of the hanger, the lift is moved under the urging force of the urging means by the lifting guide in the direction opposite to the direction of movement of the hanger during the period from when the lift starts moving upward until at least a predetermined height is reached. Therefore, if the synchronizing bar of the lift is extended and in the state of being capable of contacting the front surface in the direction of movement of the hanger, the synchronizing bar of the lift approaches the hanger and makes contact with the front surface in the direction of movement of the hanger in a sure and also soft manner, thus resulting in synchronization between the hanger and the self-propelled lifting carriage, regardless of the relative speed between the hanger and the self-propelled lifting carriage.

(3) The workpiece mounting device in which the guide member is a V-shaped block that has inclined surfaces extending in the direction parallel to the direction of movement of the hanger, and the follower is a roller that is capable of contacting the inclined surfaces of the V-shaped block.

In the workpiece mounting device described in this item, because the guide member is a V-shaped block that has inclined surfaces extending in the direction parallel to the direction of movement of the hanger, and because the follower is a roller that is capable of contacting the inclined surfaces of the V-shaped block, the roller attached to the lift moves up along the inclined surface of the V-shaped block, caused by the lift receiving the urging force of the urging means. Therefore, the lift moves in the direction opposite to the direction of movement of the hanger during the period from when the lift starts moving upward until at least a predetermined height is reached. Then, if the synchronizing bar of the lift is extended and in the state of being capable of contacting the front surface in the direction of movement of the hanger, the synchronizing bar of the lift approaches the hanger and makes contact with the front surface in the direction of movement of the hanger in a sure and also soft manner, thus resulting in synchronization between the hanger and the self-propelled lifting carriage, regardless of the relative speed between the hanger and the self-propelled lifting carriage.

(4) The workpiece mounting device in which the self-propelled lifting carriage is equipped with a slide table for supporting the lift in a manner movable in parallel with the moving path of the hanger, and the synchronizing bar is fixed to the slide table.

In the workpiece mounting device described in this item, because the self-propelled lifting carriage is equipped with the slide table for supporting the lift in a manner movable in parallel with the moving path of the hanger, and because the synchronizing bar is fixed to the slide table, the synchronizing bar fixed to the slide table can be extended to be in the extended state capable of making contact with the front surface in the direction of movement of the hanger in a manner independent from an up-down operation of the lift. That is, the synchronizing bar is extended before the lift moves up, and after the state has been achieved in which the synchronizing bar of the lift is extended to a position where the synchronizing bar can make contact with the front surface in the direction of movement of the hanger, the synchronizing bar fixed to the slide table approaches the hanger to make contact with the front surface in the direction of movement of the hanger in a sure and also soft manner by the lifting guide and the urging means, regardless of the relative speed between the hanger and the self-propelled lifting carriage.

(5) The workpiece mounting device in item (4) described above, in which the slide table is mounted on the self-propelled lifting carriage through the intermediary of slide rails and slide guides.

In the workpiece mounting device described in this item, because the slide table is mounted on the self-propelled lifting carriage through the intermediary of the slide rails and the slide guides, the slide table can move on the self-propelled lifting carriage with an extremely small force.

(6) The workpiece mounting device in item (5) described above, in which the urging means is an elastic body such as a spring balancer or rubber.

The workpiece mounting device described in this item urges the lift in the direction opposite to the direction of movement of the hanger by means of an elastic force generated by an elastic body such as a spring balancer or rubber. Because the slide table can move with an extremely small force as described above, the lift is moved under the urging force of the urging means such as those described above by the lifting guide in the direction opposite to the direction of movement of the hanger during the period from when the lift starts moving upward until at least a predetermined height is reached, without greatly adjusting the urging force, regardless of the weight of the workpiece mounted on the lift. Note that the spring balancer is a device that reels a wire by means of an elastic force of a spring and is capable of adjusting the tensile force of the wire to a desired level.

(7) The workpiece mounting device in which the self-propelled lifting carriage includes a sensor that detects an amount of displacement of the lift in the direction parallel to the moving path of the hanger, and control means that changes a running speed of the self-propelled lifting carriage based on a detection result of the sensor.

The workpiece mounting device described in this item detects an amount of displacement of the lift in the direction parallel to the moving path of the hanger by means of the sensor provided on the self-propelled lifting carriage. Then, by changing the running speed of the self-propelled lifting carriage depending on the detection result by the control means, the workpiece mounting device synchronizes the moving speed of the hanger and the running speed of the self-propelled lifting carriage.

Specifically, if the moving speed of the hanger exceeds the running speed of the self-propelled lifting carriage, the lift is pushed by the hanger and moves toward the front side of the self-propelled lifting carriage against the urging force of the urging means because the synchronizing bar is in contact with the front surface in the direction of movement of the hanger. If the amount of the forward displacement described above exceeds a predetermined amount, the relative displacement of the lift is reduced by accelerating the running speed of the self-propelled lifting carriage. Then, the amount of the relative displacement between the hanger and the lift can be contained within a certain range by restoring the running speed of the self-propelled lifting carriage at the time when the amount of the relative displacement has become less than the predetermined amount.

On the other hand, if the moving speed of the hanger is lower Man the running speed of the self-propelled lifting carriage, the hanger moves back relative to the lift, and the lift moves toward the rear side of the self-propelled lifting carriage under the urging force of the urging means while maintaining the state in which the synchronizing bar is in contact with the front surface in the direction of movement of the hanger. If the amount of the rearward displacement described above exceeds a predetermined amount, the relative displacement of the lift is reduced by decelerating the running speed of the self-propelled lifting carriage. Then, by restoring the running speed of the self-propelled lifting carriage at the time when the amount of the relative displacement has become less than the predetermined amount, the amount of the relative displacement between the hanger and the lift can be contained within a certain range.

(8) The workpiece mounting device in which the control means includes control logic that stops the self-propelled lifting carriage if the sensor detects that the amount of displacement of the lift in the direction parallel to the moving path of the hanger has rapidly increased.

According to the workpiece mounting device described in this item, if a rapid speed change occurs such as in the case that the self-propelled lifting carriage rapidly decelerates because the self-propelled lifting carriage catches a foreign object dropped on the running surface thereof, or for other reason, the difference between the moving speed of the hanger and the running speed of the self-propelled lifting carriage rapidly widens, and thus the lift is pushed by the hanger to be greatly displaced toward the front side of the self-propelled lifting carriage against the urging force of the urging means. If such a large relative displacement as described above is generated, damage of the self-propelled lifting carriage is prevented by applying an emergency stop to the self-propelled lifting carriage.

(9) The workpiece mounting device in item (8) described above, in which the control means includes control logic that stops the lift if the sensor detects that the amount of displacement of the lift in the direction parallel to the moving path of the hanger has rapidly increased.

The workpiece mounting device described in this item prevents damage of the synchronizing bar and the hanger, and moreover, damage of the workpiece and the object for workpiece mounting, by applying also an emergency stop to the hanger in response to the emergency stop of the self-propelled lifting carriage.

(10) The workpiece mounting device in which the control means includes control logic that starts extending of the synchronizing bar, running of the self-propelled lifting carriage, and upward movement of the lift, in response to approach of the hanger to the self-propelled lifting carriage in a stationary state.

In order to obtain synchronization between the moving speed of the hanger and the running speed of the self-propelled lifting carriage so as to start an operation to mount the workpiece onto the object for workpiece mounting, the workpiece mounting device described in this item starts extending of the synchronizing bar, running of the self-propelled lifting carriage, and upward movement of the lift, in response to approach of the hanger to the self-propelled lifting carriage in a stationary state. Then, the lift is moved under the urging force of the urging means by the lifting guide in the direction opposite to the direction of movement of the hanger during the period from when the lift starts moving upward until at least a predetermined height is reached; then, the synchronizing bar of the lift approaches the hanger and makes contact with the front surface in the direction of movement of the hanger in a sure and also soft manner, regardless of the relative speed between the hanger and the lift.

(11) The workpiece mounting device in which the sensor is composed of three proximity sensors provided on the self-propelled lifting carriage side in a manner arranged side by side parallel to the moving path of the hanger, and of a dog having a length spanning across all of the three proximity sensors that is provided on the lift side.

In the workpiece mounting device described in this item, if the moving speed of the hanger exceeds the running speed of the self-propelled lifting carriage, the lift is pushed by the hanger and moves toward the front side of the self-propelled lifting carriage because the synchronizing bar is in contact with the front surface in the direction of movement of the hanger. If the amount of the forward displacement described above exceeds a predetermined amount, the dog departs from the proximity sensor located at the rearmost side of the three proximity sensors in the direction of movement of the hanger, and thereby it is detected that the moving speed of the hanger exceeds the running speed of the self-propelled lifting carriage.

On the other hand, if the moving speed of the hanger is lower than the running speed of the self-propelled lifting carriage, the hanger moves back relative to the lift, and the lift moves toward the rear side of the self-propelled lifting carriage. If the amount of the rearward displacement described above exceeds a predetermined amount, the dog departs from the proximity sensor located at the most front side of the three proximity sensors in the direction of movement of the hanger, and thereby it is detected that the moving speed of the hanger is lower than the running speed of the self-propelled lifting carriage.

Further, on the other hand, if a rapid speed change occurs such as in the case that the self-propelled lifting carriage rapidly decelerates, the difference between the moving speed of the hanger and the running speed of the self-propelled lifting carriage rapidly widens, and thus the lift is pushed by the hanger to be greatly displaced toward the front side of the self-propelled lifting carriage against the urging force of the urging means. If such a large relative displacement as described above is generated, the dog departs from the proximity sensor located at the rearmost side of the three proximity sensors in the direction of movement of the hanger and from the proximity sensor located in the middle of the three proximity sensors almost at the same time, and thereby the rapid deceleration of the self-propelled lifting carriage is detected.

[Effects of the Invention]

Because the present invention is structured as described above, in the workpiece mounting device, the synchronization between the hanger and the lifting carriage can be performed in a simple and reliable manner.

DESCRIPTION OF THE REFERENCE NUMERALS

10: Workpiece mounting device, 12: Hanger, 12a: Synchronizing portion, 14: Self-propelled lifting carriage, 16: Lift, 18: Urging means, 20: Slide table, 26: Synchronizing bar, 28: Lifting guide, 30: Guide member, 30a and 30b: Inclined surfaces, 32: Follower, 36: Sensor, 40: Control means, A: Hanger moving direction, B: Vehicle body, FL: Running surface, W: Workpiece

BEST MODES For CARRYING OUT The INVENTION

Best modes for carrying out the present invention will be described below based on the attached drawings. Note that detailed description will be omitted for parts that are the same as or equivalent to those in the related art.

Figure 1:
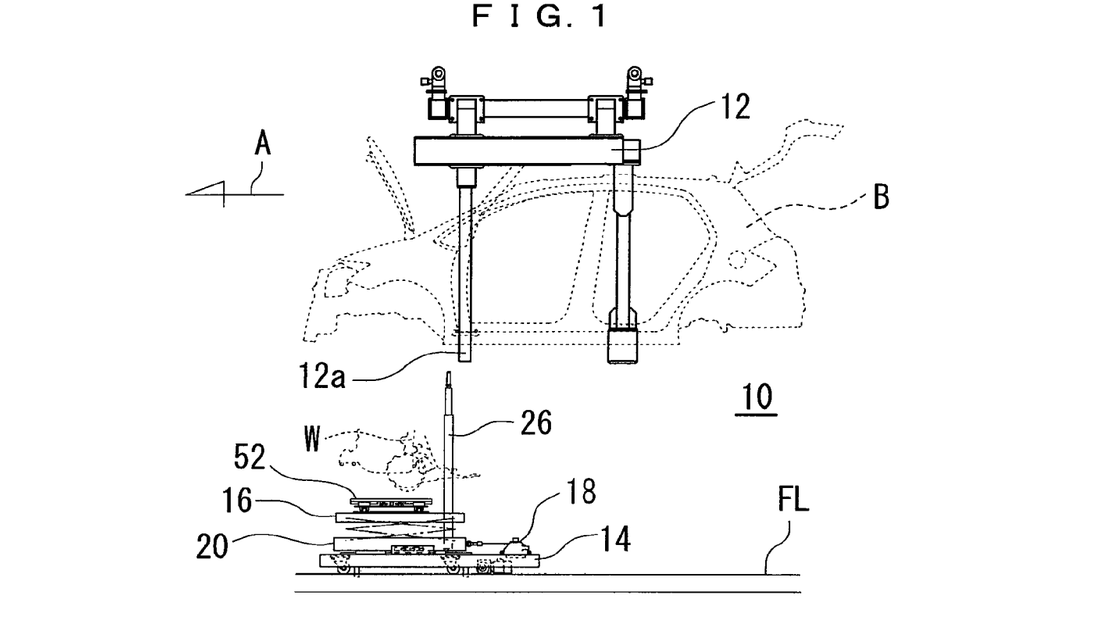
FIG. 1 is a side view of a workpiece mounting device according to an embodiment of the present invention.
Figure 2:
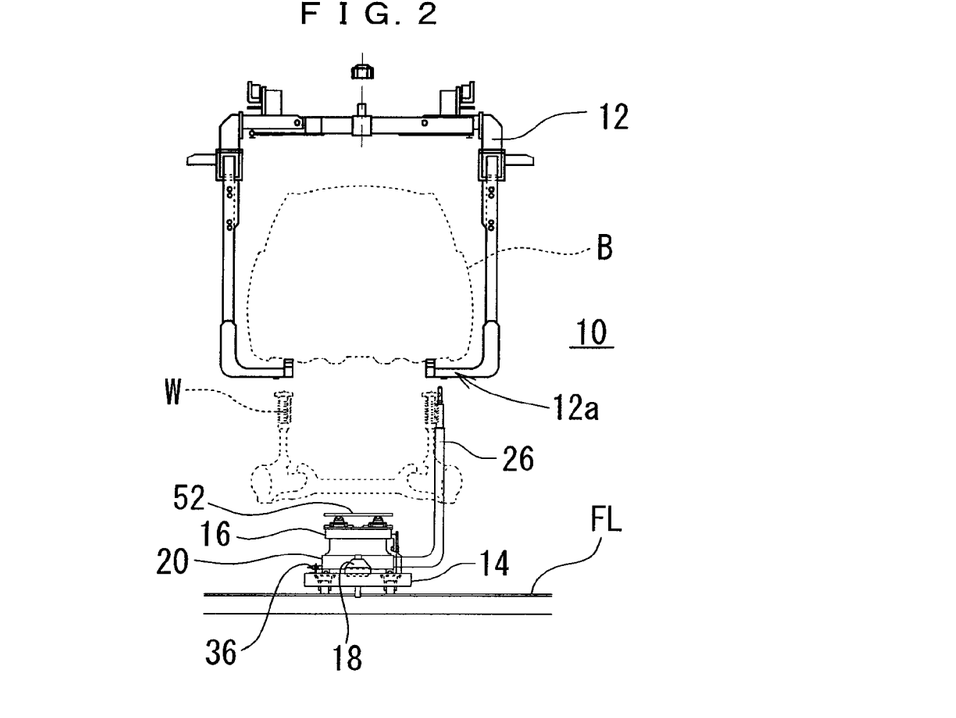
FIG. 2 is a front view of the workpiece mounting device according to the embodiment of the present invention.

A workpiece mounting device 10 according to an embodiment of the present invention is equipped with a hanger 12 that hangs and transports a vehicle body B serving as an object for mounting a workpiece W and a self-propelled lifting carriage 14 that moves along with the hanger 12 in a state of being mounted with the workpiece W, as shown in FIGS. 1 and 2. Note that a running path of the self-propelled lifting carriage 14 is installed in a manner at least partially parallel to a moving path of the hanger 12, and may be of a type in which a single unit of the self-propelled lifting carriage 14 reciprocates parallel to the moving path of the hanger 12, or of another type in which a plurality of the self-propelled lifting carriages 14 move along the running path of a looped shape.

Figure 3:
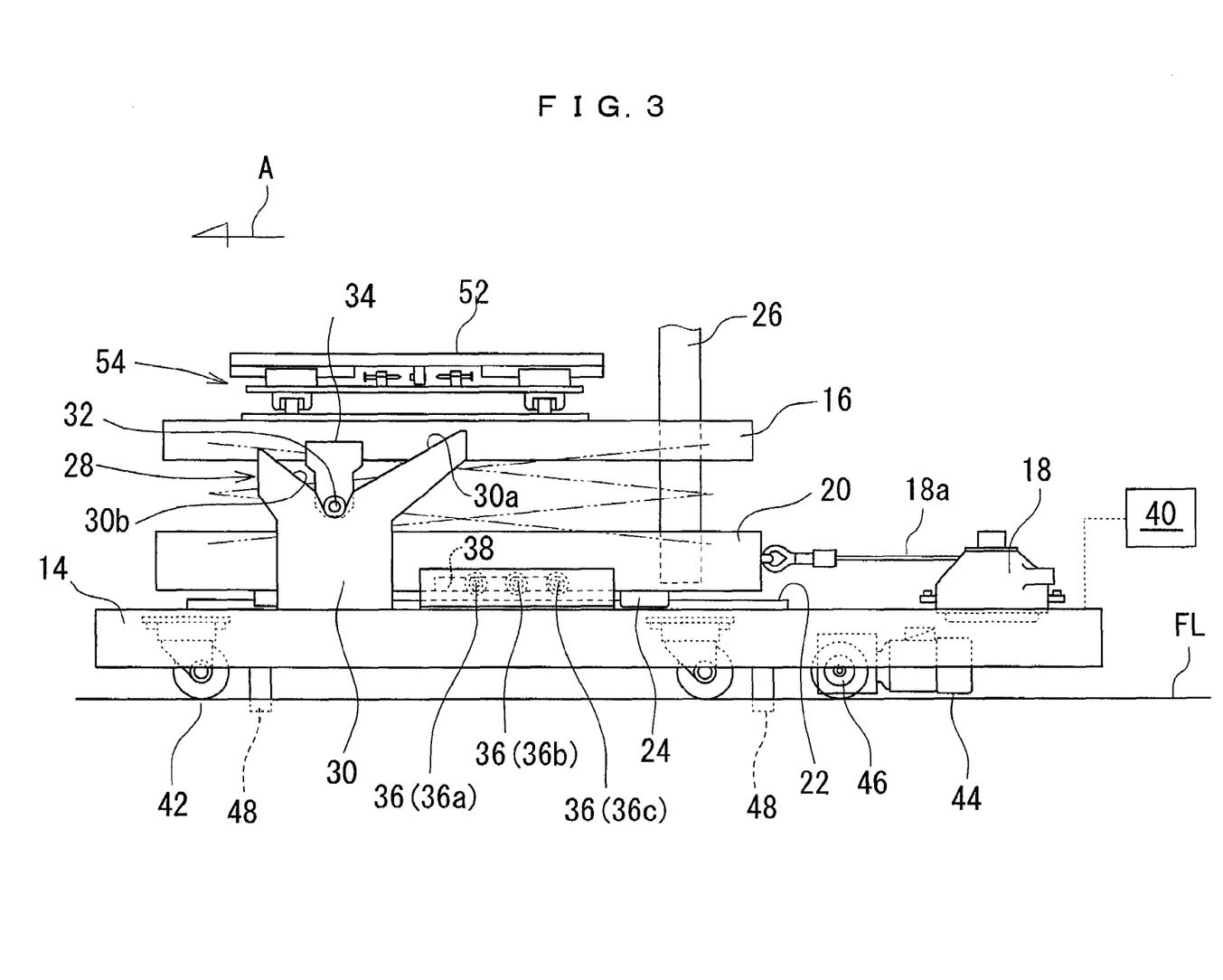
FIG. 3 is a side view of a self-propelled lifting carriage of the workpiece mounting device according to the embodiment of the present invention.
Figure 4:
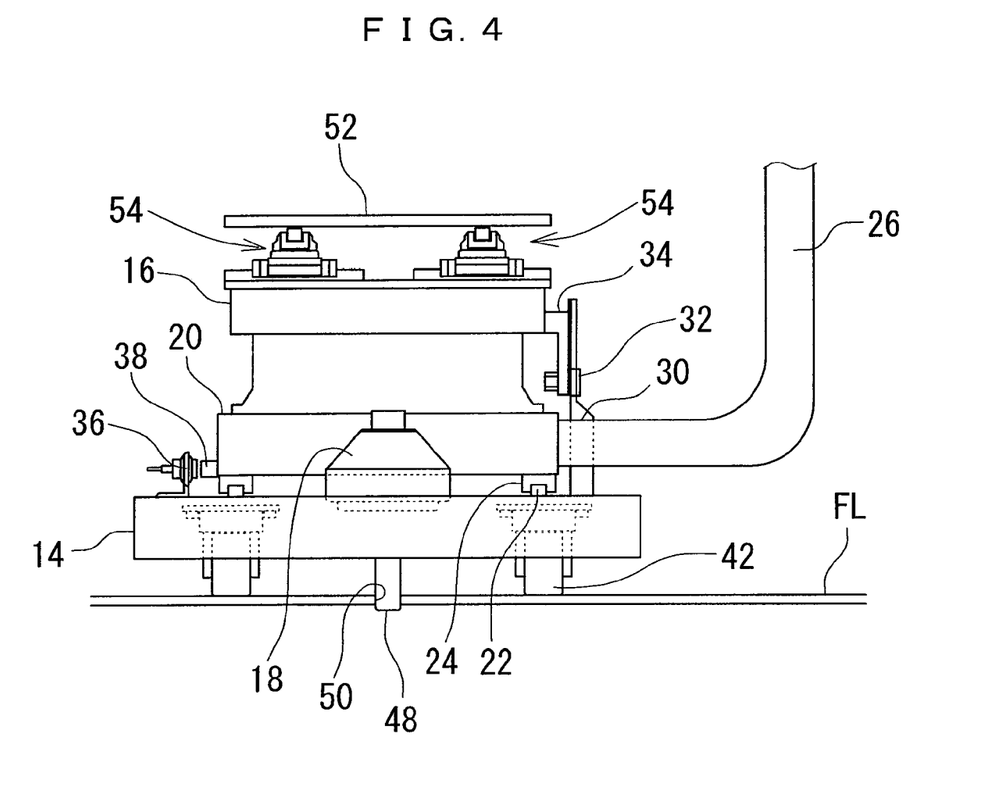
FIG. 4 is a front view of the self-propelled lifting carriage of the workpiece mounting device according to the embodiment of the present invention.

The self-propelled lifting carriage 14 is provided with a lift 16 that is movable in parallel with the moving path of the hanger 12 and urging means 18 that urges the lift 16 in a direction opposite to a direction (arrow A in FIGS. 1 and 3) of movement of the hanger 12, also as shown in FIGS. 3 and 4.

The lift 16 is installed on a slide table 20 that is slidable within a certain range in parallel with the moving path of the hanger 12, thereby making the lift 16 movable in parallel with the moving path of the hanger 12. In addition, the slide table 20 is mounted on the self-propelled lifting carriage 14 through the intermediary of slide rails 22 and slide guides 24. Note that the sliding range of the slide table 20 at a maximum is a range within which the slide table 20 does not protrude from the self-propelled lifting carriage 14.

Moreover, a synchronizing bar 26 that is extendable and contractible in the up-down direction and makes contact with a front surface (synchronizing portion) 12a in the direction of movement of the hanger 12 is fixed to the slide table 20, in the example shown in the figures. The synchronizing bar 26 can be extended so that the position of a top end portion 26a is high enough to be able to contact the synchronizing portion 12a of the hanger 12, or contracted to a position in which the synchronizing bar 26 does not interfere with the hanger 12, automatically by an electric or air actuator (or, manually as required). Note that, although a lifting mechanism of the lift 16 is illustrated for convenience as a jack of a pantograph type, the lifting mechanism is not limited to this. In addition, an electric or hydraulic actuator is suitable as a source of power for the lift 16.

A spring balancer is used for the urging means 18. The spring balancer 18 is a device that that reels a wire 18a linked to the slide table 20 by means of an elastic force of a spring and is capable of adjusting the tensile force of the wire to a desired level.

Also, the self-propelled lifting carriage 14 is provided with a lifting guide 28 that moves the lift 16, under an urging force of the urging means 18, in the direction opposite to the direction A of movement of the hanger 12, during the period from when the lift is in the state of being at the bottom dead point of a lifting range (FIGS. 1 to 5) until at least a predetermined height is reached (not necessarily a height required for performing an operation).

The lifting guide 28 has a mechanical structure in which a follower 32 attached to the lift moves along a guide member 30 that is fixed in position on the self-propelled lifting carriage 14 and has at least an inclined surface 30a sloping upward in the direction opposite to the direction of movement of the hanger 12. In the example shown in the figures, the guide member 30 is a V-shaped block that has inclined surfaces 30a and 30b extending in the direction parallel to the direction of movement of the hanger. On the other hand, the follower 32 is a roller which is fixed to the lift 16 through a bracket 34 and capable of contacting (capable of separating upward from) the inclined surfaces 30a and 30b of the V-shaped block.

Moreover, the self-propelled lifting carriage 14 is provided with a sensor 36 that detects an amount of displacement of the lift 16 in the direction A parallel to the moving path of the hanger. In the example shown in the figures, the sensor 36 is composed of three proximity sensors 36a, 36b, and 36c provided on the self-propelled lifting carriage 14 side in a manner arranged side by side parallel to the moving path of the hanger, and of a dog 38 having a length spanning across all of the three proximity sensors 36a, 36b, and 36c that is provided on the lift 16 side (slide table 20).

Furthermore, the self-propelled lifting carriage 14 is provided with control means 40 (schematically shown only in FIG. 3) that changes the running speed of the self-propelled lifting carriage 14 based on the detection result of the sensor 36. The control means 40 is composed of an electronic computer such as a microcomputer, and provided with control logic that stops the self-propelled lifting carriage 14 and also stops the lift 16 (specifically, issues a stop request of the lift 16 to control means of the lift 16) if the sensor 36 detects that the amount of displacement of the lift 16 in the direction parallel to the moving path of the hanger has rapidly increased. The control means 40 is also provided with control logic that starts, when starting an operation to mount the workpiece W onto the vehicle body B, extending of the synchronizing bar 26, running of the self-propelled lifting carriage 14, and upward movement of the lift 16, in response to approach of the hanger 12 to the self-propelled lifting carriage 14 in a stationary state.

In addition, the self-propelled lifting carriage 14 is equipped with wheels 42, a motor 44, and running wheels 46 driven by the motor 44. Furthermore, guide pins 48 protrude from the lower surface of the self-propelled lifting carriage 14, and by engaging the guide pins 48 with a guide groove 50 laid on a running surface (working surface) FL of the self-propelled lifting carriage 14, the self-propelled lifting carriage 14 runs parallel to the moving path of the hanger.

In addition, a sub-slide table 52 for mounting the workpiece W is installed on the lift 16 through the intermediary of a slider 54 that is structured so as to be slidable in two horizontal directions.

Here, description will be made of the operation of the workpiece mounting device 10 according to the embodiment of the present invention when mounting the workpiece W onto the vehicle body B. First, during the loading operation of the workpiece W onto the self-propelled lifting carriage 14, the lift 16 is set down at the bottom dead point of the lifting range, as shown in FIGS. 1 and 2. Also, at this time, because the roller 32 is located at the bottom portion of the V-shaped inclined surfaces 30a and 30b of the guide member 30 of the lifting guide 28, the position of the lift 16 in the direction parallel to the moving path of the hanger 12 is set to an original position on the self-propelled lifting carriage 14. At this time also, a tensile force to pull the lift 16 in the direction opposite to the direction A of movement of the hanger is applied to the slide table 20 by the spring balancer 18.

Figure 5:
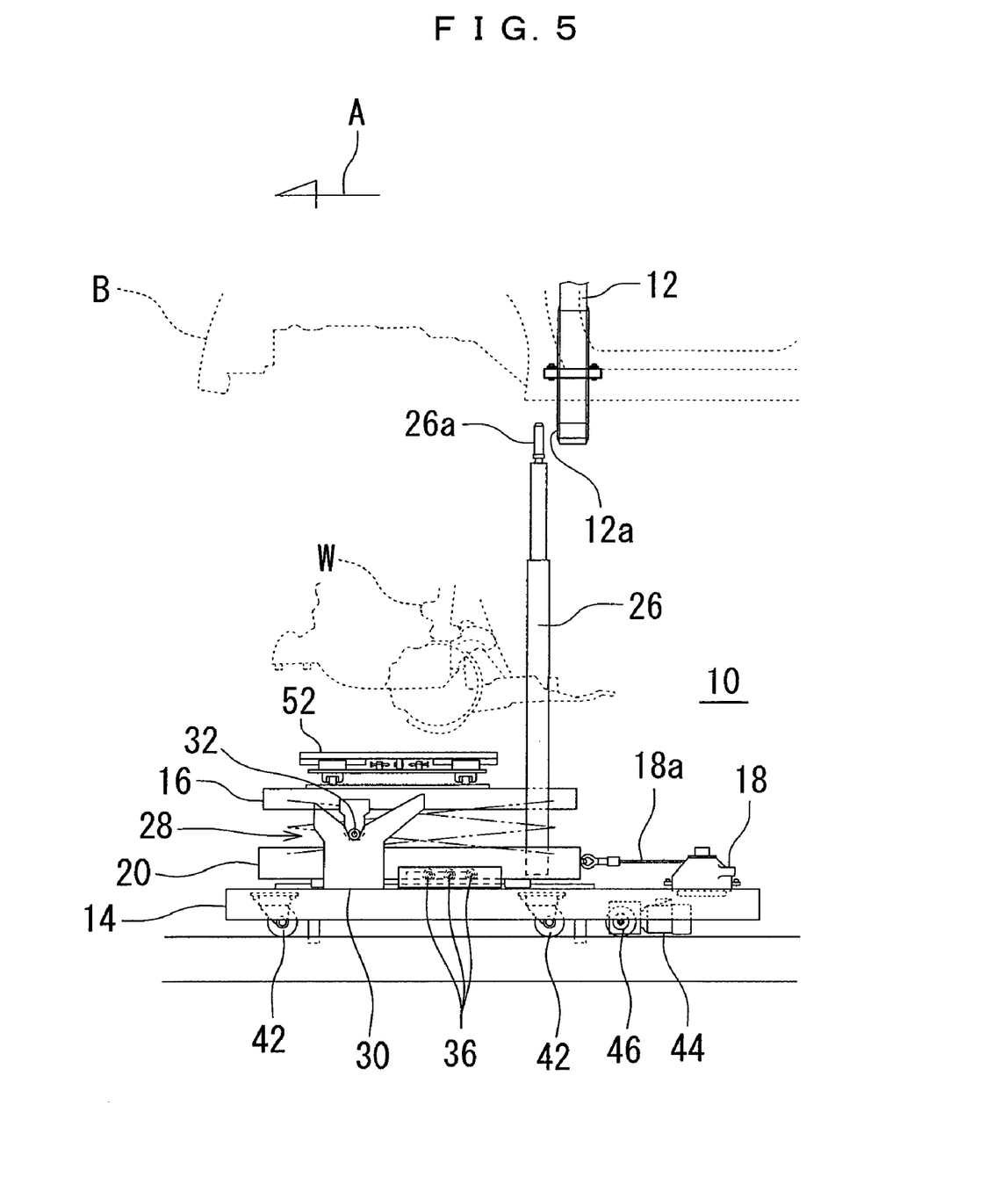
FIG. 5 is a side view showing a procedure of a mounting operation by the workpiece mounting device according to the embodiment of the present invention.

The hanger 12 transporting the vehicle body B is moving at a constant speed, and the self-propelled lifting carriage 14 is stationary in a predetermined waiting position. Then, at the time when the approaching of the hanger 12 to the self-propelled lifting carriage 14 is detected by an appropriate sensor such as a limit switch, the synchronizing bar 26 is extended by a command from the control means 40 so that the top end portion 26a is high enough to contact the synchronizing portion 12a of the hanger 12, as shown in FIG. 5. Then, as shown in FIG. 5, immediately before the top end portion 26a of the synchronizing bar 26 makes contact with the synchronizing portion 12a of the hanger 12, the motor 44 is rotated by the control means 40, then the running wheels 46 are driven, and the self-propelled lifting carriage 14 starts running at a set speed (the same speed as the moving speed of the hanger 12). Also, at the same time as this, the upward moving movement of the lift 16 is started by a command of the control means 40.

When the lift 16 moves upward, the slide table 20 supporting the lift 16 is pulled by the spring balancer 18 in the direction opposite to the direction A of movement of the hanger, and the lift 16 moves together with the slide table 20 in the direction opposite to the direction A of movement of the hanger 12. At this time, because the roller 32 provided on the lift 16 side moves along the inclined surface 30a of the guide member 30 while maintaining the state of contacting the inclined surface 30a sloping upward in the direction opposite to the direction of movement of the hanger 12, the lift 16 moves rearward comparatively slowly (moves in the direction opposite to the direction A of movement of the hanger 12). Consequently, the top end portion 26a of the synchronizing bar 26 makes contact with the synchronizing portion 12a of the hanger 12 in a soft manner (FIG. 6).

Figure 6:
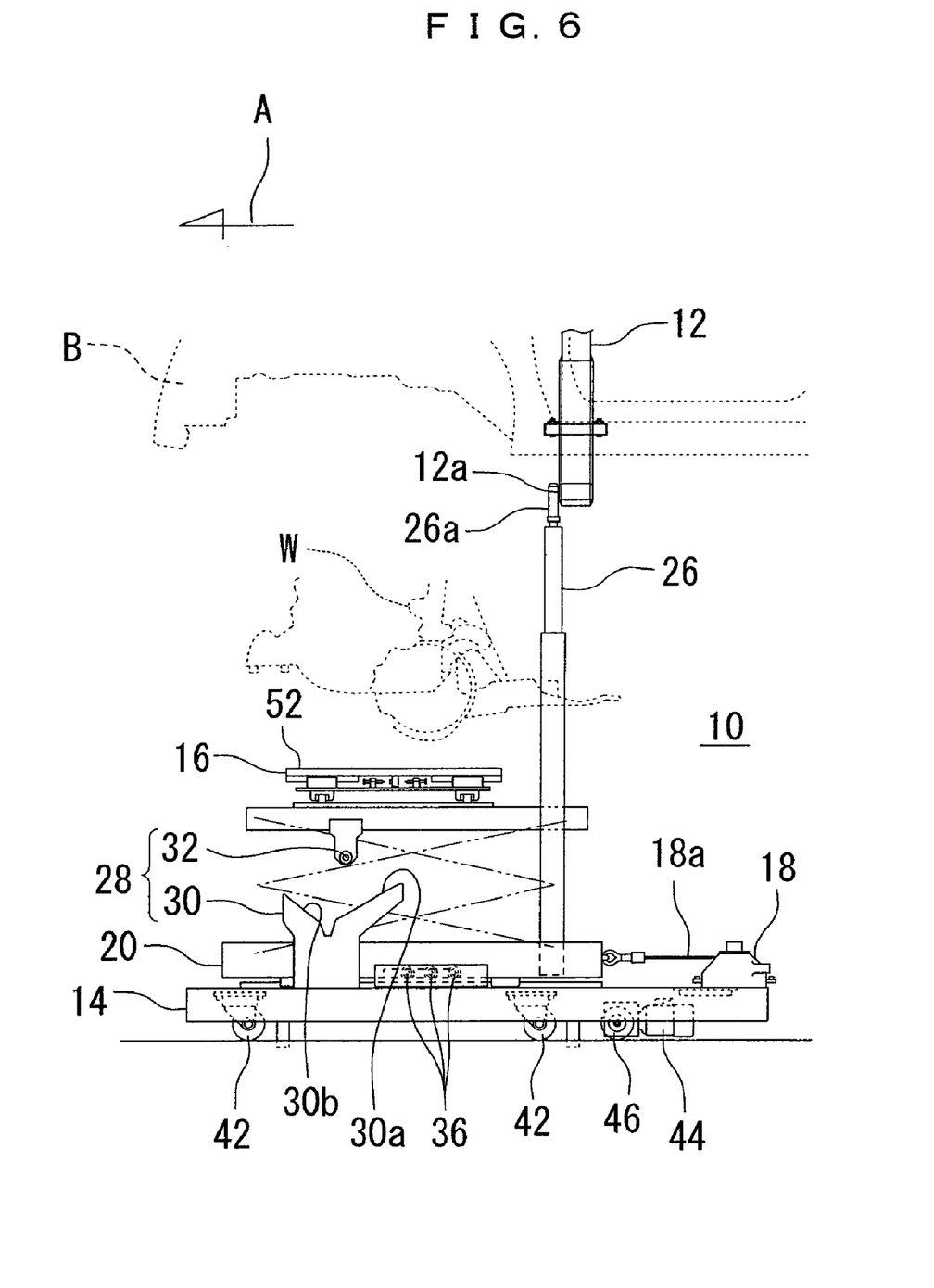
FIG. 6 is a side view showing a procedure of a mounting operation subsequent to that of FIG. 5 by the workpiece mounting device according to the embodiment of the present invention.

After the top end portion 26a of the synchronizing bar 26 has made contact with the synchronizing portion 12a of the hanger 12, the upward movement of the lift 16 continues whereas the rearward moving of the lift 16 stops, and as shown in FIG. 6, the roller 32 provided on the lift 16 side separates from the inclined surface 30a of the guide member 30. Then, the lift 16 stops moving upward by a command of the control means 40 at the time when the lift 16 has moved upward to a height suitable for mounting operation of the workpiece W onto the vehicle body B.

When the mounting operation of the workpiece W onto the vehicle body B has been completed, the lift 16 starts moving downward by a command of the control means 40. Then, the roller 32 provided on the lift 16 side makes contact again with the inclined surface 30a of the guide member 30; then, because the roller 32 moves down while moving along the inclined surface 30a, the slide table 20 supporting the lift 16 moves forward (moves in the direction A of movement of the hanger 12) against the tensile force of the spring balancer 18, and also the lift 16 moves forward together with the slide table. Then, the lift 16 moves down to the bottom dead point of the lifting range, and because the roller 32 is located at the bottom portion of the inclined surfaces 30a and 30b of the guide member 30 of the lifting guide 28 as shown in FIGS. 1 and 2, the position of the lift 16 in the direction parallel to the moving path of the hanger 12 is set again to the original position on the self-propelled lifting carriage 14.

Besides, at the time when the lift 16 moves down, if the moving speed of the hanger 12 and the running speed of the self-propelled lifting carriage 14 differ each other and thereby the lift 16 is pushed by the hanger 12 to move toward the front side of the self-propelled lifting carriage 14 as will be described later, the roller 32 provided on the lift 16 side makes contact with the inclined surface 30b of the guide member 30 sloping upward in the direction of movement of the hanger 12, and similarly, because the roller 32 moves down while moving along the inclined surface 30b, the position of the lift 16 in the direction parallel to the moving path of the hanger 12 is set again to the original position at the time when the lift 16 has moved down to the bottom dead point of the lifting range.

Therefore, the lengths of the inclined surfaces 30a and 30b of the guide member 30 are desired to be determined taking into account that, although the roller 32 need not move along the inclined surface 30a or 30b over the full travel of the inclined surface 30a or 30b of the guide member 30 when the lift 16 moves up, the roller 32 shall not run out even if the lift 16 is displaced at a maximum distance in the fore-and-aft direction when the lift 16 moves down.

Now, in the state in which the hanger 12 and the self-propelled lifting carriage 14 are synchronized with each other (state in which the top end portion 26a of the synchronizing bar 26 is in contact with the synchronizing portion 12a of the hanger 12), if the moving speed of the hanger 12 and the running speed of the self-propelled lifting carriage 14 becomes different from each other for some reason, the workpiece mounting device 10 operates as follows.

First, if the moving speed of the hanger 12 exceeds the running speed of the self-propelled lifting carriage 14, the lift 16 is pushed by the hanger 12 and moves toward the front side of the self-propelled lifting carriage 14 because the synchronizing bar 26 is in contact with the front surface (synchronizing portion 12a) in the direction of movement of the hanger 12. Then, if the amount of the forward displacement of the lift 16 exceeds a predetermined amount (for example, an allowable sliding amount of the slide table 20), the dog 38 (refer to FIGS. 3 and 4) departs from the proximity sensor 36c located at the rearmost side of the three proximity sensors 36a, 36b, and 36c in the direction of movement of the hanger, and thereby it is detected that the moving speed of the hanger 12 exceeds the running speed of the self-propelled lifting carriage 14.

In this case, the relative displacement of the lift 16 is reduced by accelerating the running speed of the self-propelled lifting carriage 14 by a command from the control means 40. Then, by restoring (decelerating) the running speed of the self-propelled lifting carriage 14 at the time when the amount of the relative displacement of the lift 16 has become less than the predetermined amount, the amount of the relative displacement between the hanger and the lift is contained within a certain range.

On the other hand, if the moving speed of the hanger 12 is lower than the running speed of the self-propelled lifting carriage 14, the hanger 12 moves back relative to the lift 16, and the lift 16 moves toward the rear side of the self-propelled lifting carriage 14 by the tensile force of the spring balancer 18. If the amount of the rearward displacement described above exceeds a predetermined amount, the dog 38 (refer to FIGS. 3 and 4) departs from the proximity sensor 36a located at the most front side of the three proximity sensors 36a, 36b, and 36c in the direction of movement of the hanger, and thereby it is detected that the moving speed of the hanger 12 is lower than the running speed of the self-propelled lifting carriage 14.

In this case, the relative displacement of the lift 16 is reduced by decelerating the running speed of the self-propelled lifting carriage 14 by a command from the control means 40. Then, by restoring (accelerating) the running speed of the self-propelled lifting carriage 14 at the time when the amount of the relative displacement of the lift 16 has become less than the predetermined amount, the amount of the relative displacement between the hanger 12 and the lift 16 is contained within a certain range.

Further, on the other hand, if a rapid speed change occurs such as in the case that the self-propelled lifting carriage 14 rapidly decelerates because the self-propelled lifting carriage 14 catches a foreign object dropped on the running surface FL thereof, or for other reason, the difference between the moving speed of the hanger 12 and the running speed of the self-propelled lifting carriage 14 rapidly widens, and thus the lift 16 is pushed by the hanger 12 to be greatly displaced toward the front side of the self-propelled lifting carriage 14 against the tensile force of the spring balancer 18. If such a large relative displacement as described above is generated, the dog 38 (refer to FIGS. 3 and 4) departs from the proximity sensor 36c located at the rearmost side of the three proximity sensors 36a, 36b, and 36c in the direction of movement of the hanger and from the proximity sensor 36b located in the middle of the three proximity sensors almost at the same time, and thereby the rapid deceleration of the self-propelled lifting carriage is detected.

In this case, damage of the self-propelled lifting carriage 14 is prevented by applying an emergency stop to the self-propelled lifting carriage 14 by a command from the control means 40. In addition, by applying also an emergency stop to the hanger 12 by a command from the control means 40 in response to the emergency stop of the self-propelled lifting carriage 14, damage of the synchronizing bar 26 and the hanger 12, and moreover, damage of the workpiece W and the vehicle body B are prevented.

According to the embodiment of the present invention structured as described above, the following operations and effects can be obtained. First, in the workpiece mounting device 10 according to the embodiment of the present invention, the lift 16 is moved by the lifting guide 28 under the urging force of the urging means 18 in the direction opposite to the direction A of movement of the hanger 12 during the period from when the lift 16 starts moving upward until at least a predetermined height is reached. Therefore, if the synchronizing bar 26 of the lift 16 is in the state of being extended to a position in which it is possible to contact the front surface 12a in the direction of movement of the hanger 12 (FIG. 5), the synchronizing bar 26 of the lift 16 approaches the hanger 12 and makes contact with the front surface 12a in the direction of movement of the hanger 12 in a sure and also soft manner, thus resulting in synchronization between the hanger 12 and the self-propelled lifting carriage 14, regardless of the relative speed between the hanger 12 and the self-propelled lifting carriage 14 (FIG. 6).

Consequently, because no excessive impact is applied to the synchronizing bar 26 and thereby a necessity to provide excessive strength in the synchronizing bar 26 and the neighboring part thereof is eliminated, the self-propelled lifting carriage 14 can be avoided from becoming large in size or being increased in weight. In addition, acceleration, deceleration, and quick stop of the self-propelled lifting carriage 14 also become easy.

In addition, in the workpiece mounting device 10 according to the embodiment of the present invention, because the lifting guide 28 has a mechanical structure in which the follower (roller) 32 attached to the lift 16 moves along the guide member (V-shaped block) 30 that is fixed in position on the self-propelled lifting carriage 14 and has at least an inclined surface 30a sloping upward in the direction opposite to the direction A of movement of the hanger, the lift 16 is moved under the urging force of the urging means 18 by the lifting guide 28 in the direction opposite to the direction A of movement of the hanger 12 during the period from when the lift 16 starts moving upward until at least a predetermined height is reached. Therefore, if the synchronizing bar 26 of the lift 16 is in the state of being extended to a position in which it is possible to contact the front surface 12a in the direction of movement of the hanger 12, the synchronizing bar 26 of the lift 16 approaches the hanger 12 and makes contact with the front surface in the direction of movement of the hanger 12 in a sure and also soft manner, thus resulting in synchronization between the hanger 12 and the self-propelled lifting carriage 14, regardless of the relative speed between the hanger 12 and the self-propelled lifting carriage 14.

In addition, because the self-propelled lifting carriage 14 is provided with the slide table 20 for supporting the lift 16 in a manner movable in parallel with the moving path of the hanger 12, and because the synchronizing bar 26 is fixed to the slide table 20, the synchronizing bar 26 fixed to the slide table 20 can be extended to be in the extended state (FIG. 5) capable of making contact with the front surface 12a in the direction of movement of the hanger 12 in a manner independent from an up-down operation of the lift 16. That is, the synchronizing bar 26 is extended before the lift 16 moves up, and after the state has been achieved in which the synchronizing bar 26 is extended to a position where the synchronizing bar 26 can make contact with the front surface 12a in the direction of movement of the hanger 12, the synchronizing bar 26 fixed to the slide table 20 approaches the hanger 12 to make contact with the front surface 12a in the direction of movement of the hanger 12 in a sure and also soft manner by the lifting guide 28 and the urging means 18, regardless of the relative speed between the hanger 12 and the self-propelled lifting carriage 14.

In addition, because the slide table 20 is mounted on the self-propelled lifting carriage 14 through the intermediary of the slide rails 22 and the slide guides 24, the slide table 20 can move on the self-propelled lifting carriage 14 with an extremely small force. Besides, the lift 16 is urged in the direction opposite to the direction A of movement of the hanger 12 by means of the elastic force generated by an elastic body such as the spring balancer or rubber. Because the slide table 20 can move with an extremely small force, the lift 16 is smoothly moved under the urging force of the urging means 18 such as those described above by the lifting guide 28 in the direction opposite to the direction A of movement of the hanger 12 during the period from when the lift 16 starts moving upward until at least a predetermined height is reached, without greatly adjusting the urging force, regardless of the weight of the workpiece W on the lift 16.

In addition, the workpiece mounting device 10 according to the embodiment of the present invention detects the amount of displacement of the lift 16 in the direction parallel to the moving path of the hanger 12 by means of the sensor 36 provided on the self-propelled lifting carriage 14, and by changing the running speed of the self-propelled lifting carriage 14 depending on the detection result by means of the control means 40, synchronizes the moving speed of the hanger 12 and the running speed of the self-propelled lifting carriage 14.

Specifically, if the moving speed of the hanger 12 exceeds the running speed of the self-propelled lifting carriage 14, the lift 16 is pushed by the hanger 12 and moves toward the front side of the self-propelled lifting carriage 14 against the urging force of the urging means 18 because the synchronizing bar 26 is in contact with the front surface 12a in the direction of movement of the hanger 12. If the amount of the forward displacement described above exceeds a predetermined amount, the relative displacement of the lift 16 is reduced by accelerating the running speed of the self-propelled lifting carriage 14. Then, the amount of the relative displacement between the hanger 12 and the lift 16 can be contained within a certain range by restoring the running speed of the self-propelled lifting carriage 14 at the time when the amount of the relative displacement has become less than the predetermined amount.

On the other hand, if the moving speed of the hanger 12 is lower than the running speed of the self-propelled lifting carriage 14, the hanger 12 moves back relative to the lift 16, and the lift 16 moves toward the rear side of the self-propelled lifting carriage 14 under the urging force of the urging means 18 while maintaining the state in which the synchronizing bar 26 is in contact with the front surface 12a in the direction of movement of the hanger 12. If the amount of the rearward displacement described above exceeds a predetermined amount, the relative displacement of the lift 16 is reduced by decelerating the running speed of the self-propelled lifting carriage 14. Then, by restoring the running speed of the self-propelled lifting carriage 14 at the time when the amount of the relative displacement has become less than the predetermined amount, the amount of the relative displacement between the hanger 12 and the lift 16 can be contained within a certain range.

Furthermore, if a rapid speed change occurs such as in the case that the self-propelled lifting carriage 14 rapidly decelerates, the difference between the moving speed of the hanger 12 and the running speed of the self-propelled lifting carriage 14 rapidly widens, and thus the lift 16 is pushed by the hanger 12 to be greatly displaced toward the front side of the self-propelled lifting carriage 14 against the urging force of the urging means 18. If such a large relative displacement as described above is generated, damage of the self-propelled lifting carriage 14 can be prevented by applying an emergency stop to the self-propelled lifting carriage 14.

In addition, by applying also an emergency stop to the hanger 12 in response to the emergency stop of the self-propelled lifting carriage 14, damage of the synchronizing bar 26 and the hanger 12, and moreover, damage of the workpiece W and the object B for mounting the workpiece can be prevented.

In addition, in order to obtain synchronization between the moving speed of the hanger 12 and the running speed of the self-propelled lifting carriage 14 so as to start the operation to mount the workpiece W onto the object B for mounting the workpiece, the workpiece mounting device 10 according to the embodiment of the present invention starts the extending of the synchronizing bar 26, the running of the self-propelled lifting carriage 14, and the upward movement of the lift 16, in response to the approach of the hanger 12 to the self-propelled lifting carriage 14 in the stationary state. Then, the lift 16 is moved under the urging force of the urging means 18 by the lifting guide 28 in the direction opposite to the direction A of movement of the hanger during the period from when the lift 16 starts moving upward until at least a predetermined height is reached. Then, the synchronizing bar 26 of the lift 16 approaches the hanger 12 and makes contact with the front surface 12a in the direction of movement of the hanger 12 in a sure and also soft manner, thus resulting in synchronization between the hanger 12 and the self-propelled lifting carriage 14, regardless of the relative speed between the hanger 12 and the lift 16.

The invention claimed is:

1. A workpiece mounting device comprising:
    a hanger configured to hang and transport an object for workpiece mounting, and
    a self-propelled lifting carriage configured to move along with the hanger in a state of being mounted with a workpiece on a running path installed in a manner at least substantially parallel to a moving path of the hanger,
    wherein the self-propelled lifting carriage is equipped with a lift that is movable within a certain range in parallel with the moving path of the hanger, and an urging device configured to urge the lift in a direction opposite to a direction of movement of the hanger; and
    the lift is equipped with a synchronizing bar that is extendable and contractible in the up-and-down direction and is configured to make contact with a front surface of the hanger in the direction of movement of the hanger, a lifting guide configured to move the lift in the direction opposite to the direction of movement of the hanger under the urging force of the urging device during a period from when the lift starts moving upward until at least a predetermined height is reached.

2. The workpiece mounting device according to claim 1, wherein the lifting guide has a mechanical structure in which a follower attached to the lift is configured to move along a guide member that is fixed in position on the self-propelled lifting carriage and has at least an inclined surface sloping upward in the direction opposite to the direction of movement of the hanger.

3. The workpiece mounting device according to claim 2, wherein the guide member is a V-shaped block that has inclined surfaces extending in the direction parallel to the direction of movement of the hanger, and the follower is a roller that is configured to contact the inclined surfaces of the V-shaped block.

4. The workpiece mounting device according to claim 1, wherein the self-propelled lifting carriage is equipped with a slide table for supporting the lift in a manner movable in parallel with the moving path of the hanger, and the synchronizing bar is fixed to the slide table.

5. The workpiece mounting device of claim 1, wherein the self-propelled lifting carriage further comprises a slide table mounted on rails.

6. The workpiece mounting device of claim 1, wherein the urging device comprises a spring balancer having a wire connected to the slide table.

7. The workpiece mounting device of claim 1, further comprising a sub-slide table installed on the lift for mounting the workpiece.

8. The workpiece mounting device of claim 1, further comprising a microcomputer programmed to stop the lift and stop the carriage if a sensor detects that a displacement of the lift in a direction parallel to the moving path of the hanger has increased.

9. The workpiece mounting device of claim 1, further comprising three proximity sensors.

10. A workpiece mounting device comprising:
    a hanger configured to hang and transport an object for workpiece mounting, and
    a self-propelled lifting carriage configured to move along with the hanger in a state of being mounted with a workpiece on a running path installed in a manner at least substantially parallel to a moving path of the hanger,
    wherein the self-propelled lifting carriage is equipped with a lift that is movable within a certain range in parallel with the moving path of the hanger, and an urging device configured to urge the lift in a direction opposite to a direction of movement of the hanger; and
    the lift is equipped with a synchronizing bar that is extendable and contractible in the up-and-down direction and is configured to make contact with a front surface of the hanger in the direction of movement of the hanger, a lifting guide configured to move the lift in the direction opposite to the direction of movement of the hanger under the urging force of the urging device during a period from when the lift starts moving upward until at least a predetermined height is reached, wherein the self-propelled lifting carriage comprises: a sensor that detects an amount of displacement of the lift in the direction parallel to the moving path of the hanger, and a control device that changes a running speed of the self-propelled lifting carriage based on a detection result of the sensor.

11. The workpiece mounting device according to claim 10, wherein the control device includes control logic that stops the self-propelled lifting carriage and also stops the lift if the sensor detects that the amount of displacement of the lift in the direction parallel to the moving path of the hanger has rapidly increased.

12. The workpiece mounting device according to claim 10, wherein the control device includes control logic that starts extending of the synchronizing bar, running of the self-propelled lifting carriage, and upward movement of the lift, in response to approach of the hanger to the self-propelled lifting carriage in a stationary state.

13. The workpiece mounting device according to claim 10, wherein the lifting guide has a mechanical structure in which a follower attached to the lift is configured to move along a guide member that is fixed in position on the self-propelled lifting carriage and has at least an inclined surface sloping upward in the direction opposite to the direction of movement of the hanger.

14. The workpiece mounting device according to claim 10, wherein the guide member is a V-shaped block that has inclined surfaces extending in the direction parallel to the direction of movement of the hanger, and the follower is a roller that is configured to contact the inclined surfaces of the V-shaped block.

15. The workpiece mounting device according to claim 10, wherein the self-propelled lifting carriage is equipped with a slide table for supporting the lift in a manner movable in parallel with the moving path of the hanger, and the synchronizing bar is fixed to the slide table.

16. A workpiece mounting device comprising:
a hanger configured to hang and transport an object for workpiece mounting; and
a self-propelled lifting carriage configured to move along with the hanger in a state of being mounted with a workpiece on a running path installed in a manner at least substantially parallel to a moving path of the hanger, said self-propelled lifting carriage comprising:
a lift movable within a certain range in parallel with the moving path of the hanger;
an urging device configured to urge the lift in a direction opposite to a direction of movement of the hanger;
a synchronizing bar that is extendable and contractible in the up-and-down direction and is configured to make contact with a front surface of the hanger in the direction of movement of the hanger;
a lifting guide configured to move the lift in the direction opposite to the direction of movement of the hanger under the urging force of the urging device during a period from when the lift starts moving upward until at least a predetermined height is reached; and
at least one sensor that detects an amount of displacement of the lift in the direction parallel to the moving path of the hanger.

17. The workpiece mounting device of claim 16, wherein the lifting carriage further comprises a slide table mounted on rails.

18. The workpiece mounting device of claim 16, wherein the urging device comprises a spring balancer having a wire connected to the slide table.

19. The workpiece mounting device of claim 16, further comprising a sub-slide table installed on the lift for mounting the workpiece.

20. The workpiece mounting device of claim 16, further comprising a microcomputer programmed to stop the lift and stop the carriage if a sensor detects that a displacement of the lift in a direction parallel to the moving path of the hanger has increased.

* * * * *